Dec. 18, 1928.

R. LEE 1,695,289

HYDRAULIC TRANSMISSION

Filed July 13, 1925  2 Sheets-Sheet 1

WITNESSES
M. E. Downey
E. L. Neal

INVENTOR
Royal Lee
By R. S. Caldwell
ATTORNEY

Dec. 18, 1928.

R. LEE 1,695,289

HYDRAULIC TRANSMISSION

Filed July 13, 1925   2 Sheets-Sheet 2

WITNESSES
M. E. Downey
C. L. Naal

INVENTOR
Royal Lee
By R. J. Caldwell
ATTORNEY

Patented Dec. 18, 1928.

1,695,289

UNITED STATES PATENT OFFICE.

ROYAL LEE, OF MILWAUKEE, WISCONSIN, ASSIGNOR TO LEE ENGINEERING RESEARCH CORPORATION, OF MILWAUKEE, WISCONSIN, A CORPORATION OF WISCONSIN.

HYDRAULIC TRANSMISSION.

Application filed July 13, 1925. Serial No. 43,280.

The invention relates to variable-speed hydraulic transmissions.

An object of the invention is to provide a rotary hydraulic machine including radially disposed cylinders in which diametrically opposite pistons are movable in phase during the cycle of operation to balance reciprocating masses, thereby permitting high speed operation with a minimum of vibration, and a more specific object is the provision of such piston arrangement in a variable-speed hydraulic transmission of the type in which a speed ratio of unity is obtained by a direct drive to afford a high mean efficiency.

Another object of the invention is to provide a rotary hydraulic machine in which an angularly displaceable valve member is movable to vary the discharge of the fluid medium in alternative opposite directions, and a more specific object is the provision of such valve member in a variable-speed hydraulic transmission, the valve member being axially movable to inoperative position to permit free passage of the medium and thereby temporarily render the mechanism ineffective to transmit power.

A further object of the invention is to provide a variable-speed hydraulic transmission for use with automotive vehicles and the like which is of simple and compact construction, and which does not include or require any gearing connections.

The invention further consists in the several features hereinafter set forth and more particularly defined by the annexed claims.

In the accompanying drawings, Fig. 1 is a longitudinal sectional view of a variable-speed hydraulic transmission embodying the invention;

Figure 2:
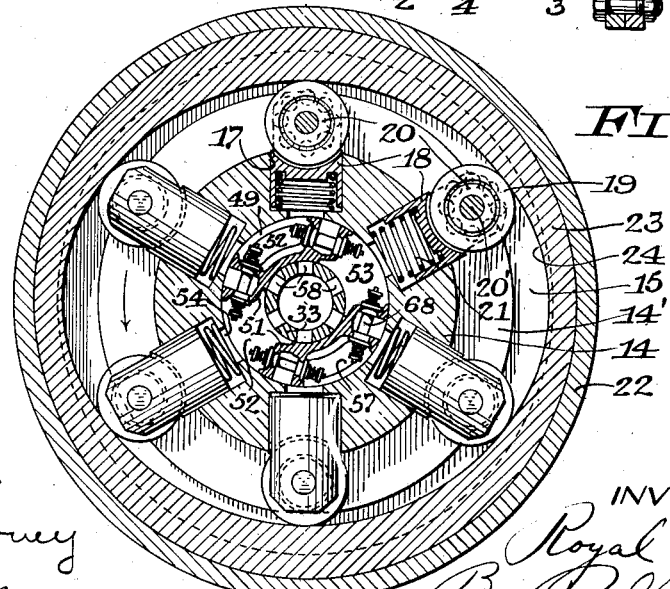
Fig. 2 is a transverse sectional view taken on the line 2—2 of Fig. 1.

In these drawings, a driving shaft 10, which may be the crank shaft of an automotive internal combustion engine, is provided with a terminal flange 11 securely bolted to a disk or plate 12 which may form a flywheel together with attached parts hereinafter described. A cam ring 13 is secured at the periphery of the disk 12 and extends laterally of the disk. A cylinder barrel 14 provided with a radially extending flange 15 is secured in concentric relation to the cam ring by bolts 16 which also secure the cam ring to the disk, the cam ring being interposed between the disk and the flange 15. The cylinder barrel 14 is provided with a group of radially extending cylinder bores 17 which are disposed in diametrically opposite relation, as shown in Fig. 2. Pistons 18 are mounted in the bores 17 and each is provided at its outer end with a roller 19 mounted on an anti-friction bearing 20 carried by a pin 20' extending transversely of the piston. A coil spring 21 is preferably provided at the inner end of each piston to urge it outwardly, and an annular groove 14' is formed about the cylinder barrel in the plane of the pistons to provide clearance for the rollers and to keep them in alignment.

A stationary bell housing 22 has secured within it a cam ring 23 which may be identical with the cam ring 13 for convenience in manufacture. The cam surface 24 of the cam ring is preferably elliptical in shape, as shown in Fig. 2, and forms a trackway for the rollers 19 of the pistons 18 in the cylinder barrel 14 to effect the reciprocation of the pistons. A bearing plate 25 is also secured to the housing and to the cam ring, as by bolts 26 and 27 respectively, and has a hub 28 forming a bearing for the reduced hub end 29 of the cylinder barrel 14. The bell housing may also conveniently cover the flywheel 12 and its attached cam ring 13.

Figure 3:
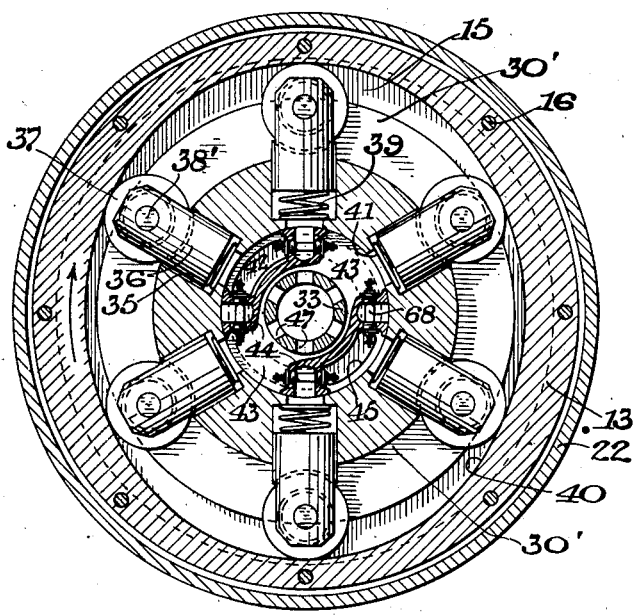
Fig. 3 is a similar view taken on the line 3—3 of Fig. 1.

A second cylinder barrel 30 is journalled on a hub 31 of the cylinder barrel 14 and is secured to a flange 32 of a driven shaft 33 journalled in the cylinder barrel 14 and also in a hub portion 34 of the bell housing 22. The cylinder barrel 30 is provided with a group of cylinder bores 35 which are disposed in diametrically opposite relation, as shown in Fig. 3. Pistons 36 are mounted in the bores 35 and each is provided at its outer end with a roller 37 mounted on an anti-friction bearing 38 carried by a pin 38' extending transversely through the piston. A coil spring 39 is preferably provided at the inner end of each piston to urge it outwardly, and an annular groove 30' is formed about the cylinder barrel in the plane of the pistons to provide clearance for the rollers and to keep them in alignment.

The rollers 37 engage an elliptical trackway 40 of the cam ring 13 to effect the reciprocation of the pistons 36. The cylinders 35 of the cylinder barrel 30 are provided with ports 41 at their inner ends which are adapted to register with quadrant spaces 42 and 43 in the hub 31 of the cylinder barrel 14, the quadrant spaces being separated from each other by partitions 44. The quadrant spaces 42 communicate by means of segmental ports 45 with an annular space 46 in the cylinder barrel 14, while the quadrant spaces 43 are open to ports 47 in the driven shaft 33 on which the cylinder barrel is rotatably mounted.

A relatively stationary valve member 48 is disposed in close fitting relation on the driven shaft 33 and carries spaced flanges 49 and 50 at one end joined by radially extending partitions 51 to form quadrant spaces 52 and 53 which are open at their outer ends into communication with ports 54 at the inner ends of the cylinders 17 of the cylinder barrel 14. The peripheries of the flanges 49 and 50 are disposed in close fitting relation within a bore 55, and the end flange 49 abuts against a shoulder 56 on the cylinder barrel 14 adjacent the annular space 46 and is provided with segmental ports 57 affording communication between said annular space and the quadrant spaces 52. The quadrant spaces 53 of the valve member are open at their inner ends to radially-extending ports 58 in the driven shaft 33.

For the purpose of varying the speed as hereinafter described, the valve member 48 is capable of angular displacement to change the relation of the various ports, a movement of 90° being sufficient to afford the desired range of speed. For this purpose the outer end of the valve member is provided with a lever 59, and an operating rod 60 is connected to the outer end of said lever by means of a pin 61 secured to the rod and extending through the end of the lever.

The end of the bore 55 is closed by a flange 62 secured to the hub end 29 of the cylinder barrel 14 and extending inwardly in close fitting relation about the valve member 48. The valve member 48 is preferably movable axially to the dotted line position shown in Fig. 1 for the purpose hereinafter noted. and such movement is accomplished by providing the end of the valve member with a pair of spaced radially-extending flanges 63 for receiving the ends of a shifting fork 64 mounted on a transversely-extending rock shaft 65.

Figure 5:
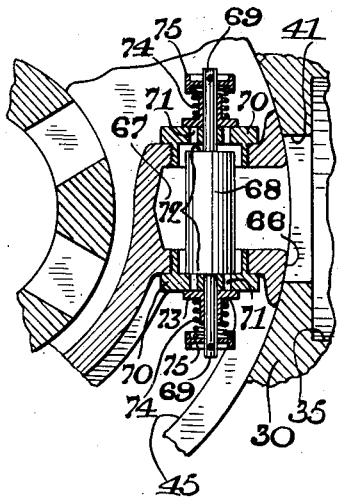
Fig. 5 is a fragmentary detail sectional view showing a selective relief valve.

In each of the partitions separating the quadrant spaces 42 and 43, 52 and 53, is preferably provided a selective relief valve which permits ample valve width for proper sealing without giving rise to the generation of destructive pressures in the cylinders, and obtains the full effectiveness of the compression strokes of the pistons. A valve of this type is more particularly shown and described in my co-pending application for variable speed transmission, Serial No. 716,424, filed May 28, 1924, which has matured into Patent Number 1648000, granted November 8, 1927, but is here briefly described. As seen in Fig. 5, the outer end of each partition is provided with a valve surface 66 somewhat wider than the cylinder port which it closes in passing, and an opening 67 extends radially into the partition from the central part of the valve surface. A valve member 68 extends transversely of the opening with reduced stems 69 at each end slidably mounted in caps 70 secured to opposite sides of the partition, the stems 69 extending beyond the caps into the adjacent quadrant spaces. Each of the caps is provided with a set of ports 71, the ports in one cap being closed on the inside by one of a pair of shoulders 72 on the valve member 68 and both sets of ports being closed on the outside by flanged valves 73 slidably mounted on the valve stems 69, the valves 73 being normally seated by means of coil springs 74 held under compression by cup washers 75 secured to the outer ends of the valve stems.

The cylinders and comunicating passages are completely filled with a fluid medium, preferably an oil, and to insure a completely filled system at all times, small quantities of oil may be forced into low-pressure spaces while the transmission is in operation. This introduction of oil will also serve to insure the engagement of the piston rollers with their trackways. The displacement of the pistons places the oil under different pressures in the quadrant spaces on opposite sides of each partition, as hereinafter described. Upon the relative rotation of a cylinder barrel with respect to the cooperating valve elements, and at a time when a partition does not close a cylinder port, the flanged valves 73 close the ports 71 on both sides of the partition, so that no leakage of oil will occur between high and low pressure spaces, and the valve member 68 is moved by the pressure of oil in the high pressure space to close the inner end of the ports 71 adjacent the low pressure space.

When the end of the partition completely bridges a cylinder port the pressure developed in the isolated cylinder during the closure period will be relieved through the ports 71 communicating with the high pressure space, the spring-pressed valve 73 being forced outwardly by the cylinder pressure and the ports 71 communicating with the low pressure space being held closed on the inside by the valve member 68.

During a partial closure of the port a by-pass leakage from the high pressure space is prevented because the valve member 68 closes the inner ends of the ports 71 communicating with the low pressure space.

In the transmission of this invention, speed changes are produced by controlling the displacement of oil between the cylinder barrels, the displacement in one unit being neutralized or off-set by the displacement of oil in the other cylinder barrel. The displacement of the pistons in the cylinder barrel 14 is made larger than that of the pistons in the cylinder barrel 30 in order to afford a reverse drive, as hereinafter described. In the present instance the larger displacement is obtained by increasing the cylinder diameter, but an increase of stroke would obviously provide the same result.

In operation, the rotation of the cylinder barrel 14 by the driving shaft 10 effects the reciprocation of the pistons 18 by reason of the travel of the piston rollers 19 on the elliptical trackway 24 of the stationary cam ring 23. The oil displaced by the pistons 18 is discharged through the cylinder ports 54 into the quadrant spaces of the relatively stationary valve member 48. When the valve member assumes the neutral position shown in Fig. 2, a larger part of the oil is discharged into the quadrant spaces 53 and inwardly through the ports 58 of the hollow driven shaft 33. The oil discharged into the driven shaft is equal to the piston displacement of the cylinder barrel 30 and the excess displaced in the cylinder barrel 14 merely circulates idly within the cylinder barrel incident to the offset position of the partitions of the stationary valve member 48 with respect to the major and minor axes of the elliptical trackway 24 of the stationary cam ring 23.

The partitions 44 in the hub 31 of the cylinder barrel 14 are placed to coincide with the major and minor axes of the cam ring 13 secured to this cylinder barrel, as seen in Fig. 3. The oil discharged by the cylinder barrel 14 into the hollow driven shaft is conducted outwardly through the ports 47 and into the quadrant spaces 43 which communicate with those cylinders 34 in which the pistons are movable outwardly incident to the relative rotation of the cam ring 13 with respect to the cylinder barrel 30. As viewed in the passing position of Fig. 3, the cylinders in question occupy the upper right hand and lower left hand quarters of the cylinder barrel. The admission of oil to these cylinders urges the pistons outwardly and the reaction of the pistons on the elliptical cam trackway gives rise to a lateral component of force which drives the cylinder barrel 30 counter-clockwise with respect to the cam ring 13, as seen in Fig. 3, and at the same angular velocity, the net result being that the cylinder barrel 30 remains stationary. The oil then displaced by the pistons in the compressing quarters of the cylinder barrel 30 is discharged into the quadrant spaces 42 and through the segmental ports 45 into the annular space 46, thence through the segmental ports 57 and into the quadrant spaces 52 of the stationary valve member 48, from which the oil flows into the expanding quarters of the cylinder barrel 14. In this condition of the transmission the oil merely circulates idly between the cylinder barrels and the excess oil displaced in the cylinder barrel 14 incident to its larger displacement merely circulates idly within this cylinder barrel.

Figure 4:
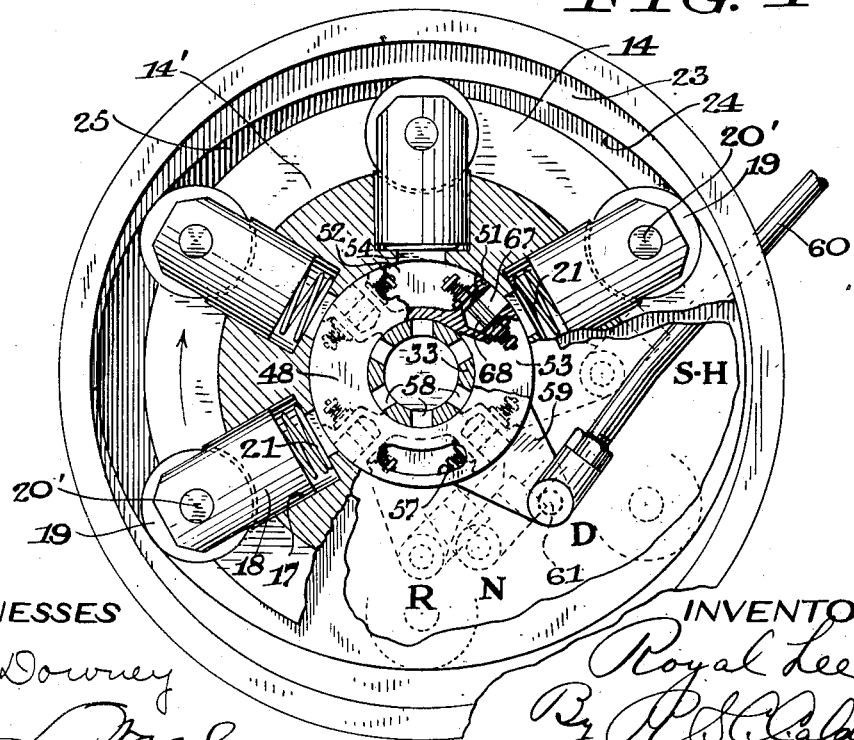
Fig. 4 is a transverse sectional view taken generally on the line 4—4 of Fig. 1, parts being broken away to show valve operating means.

For direct drive, the stationary valve member 48 is moved to the "D" position of Fig. 4, in which the partitions 51 separating the quadrant spaces assume an angular position midway between the major and minor axes of the elliptical trackway. In this position, it will be seen that the quadrant spaces 52 and 53 are each in equal communication with adjacent compressing and expanding quarters of the cylinder barrel, so that all the oil discharged from the compressing quarters into the quadrant spaces is immediately received by the adjacent expanding quarters, thus obtaining a complete by-pass of oil within the cylinder barrel, without any delivery of oil to the cylinder barrel 30. Since the cylinder barrel 14 also affords no outlet for oil from the cylinder barrel 30, there can be no displacement of oil in the cylinder barrel 30, and as a consequence the pistons 36 and the cylinder barrel 30 are therefore locked against relative movement which effectively locks the cylinder barrel 30 to the cam ring 13. The driven shaft 33 being secured directly to the cylinder barrel 30 is thereby connected directly to the driving shaft 10, thus affording a direct drive in which no movement of oil takes place in the cylinder barrel 30 and having a high efficiency comparable with that of the usual gear transmission.

For intermediate speeds, the stationary valve member 48 is moved to a position between the "N" and "D" positions indicated in Fig. 4, thereby furnishing a reaction causing rotation of the driven shaft at a speed corresponding to the variable displacement-offset effect of the cylinder barrel 14.

It will be seen that the torque at intermediate speeds is transmitted partly by direct passage from the driving member and partly by the variable speed means, so that a high efficiency is obtained approaching that of direct drive as the speed ratio approaches unity.

To obtain a reverse rotation of the driven shaft, the valve member 48 is placed in the "R" position, indicated in Fig. 4, in which all of the oil discharged from the compressing quarters of the cylinder barrel 14 is delivered into the hollow driven shaft 33 and through the quadrant spaces 43 into the cylinders of the expanding quarters in the cylinder barrel 30. As the quantity of oil delivered to the cylinder barrel 30 exceeds the piston displacement of this cylinder barrel when in a neutral position, the cylinder barrel is accordingly driven in a reverse direction with respect to the cam ring 13 at a greater negative angular velocity than the positive angular velocity of the cam ring, with the net result that the driven shaft is rotated in the reverse direction at an actual velocity equal to the algebraic difference of the velocities of the cylinder barrel and cam ring.

A speed ratio above unity, which may be termed a "super-high," is obtained by setting the valve member 48 in the dotted line "S—H" position of Fig. 4 or in any position intermediate the "D" and "S—H" positions. Oil is then delivered from the cylinder barrel 14 through the annular space 46 to the quadrant spaces 42 and to cylinders communicating therewith to accelerate the movement of the cylinder barrel 30 with respect to the cam ring. In other words, oil is forced into those cylinders of the cylinder barrel 30 in which an outward movement of the pistons will cause a relative forward rotation of the cylinder barrel with respect to the co-operating cam ring.

The speed change from reverse through neutral and direct to "super-high" is obtained by a simple progressive movement of the control lever of the valve member, the changes in speed being continuously variable and the speed changing mechanism beginning to function as the speed ratio is varied in either direction from the direct drive. There is no appreciable reaction on the control member so that it may be very easily moved to any of its operative positions.

Figure 1:
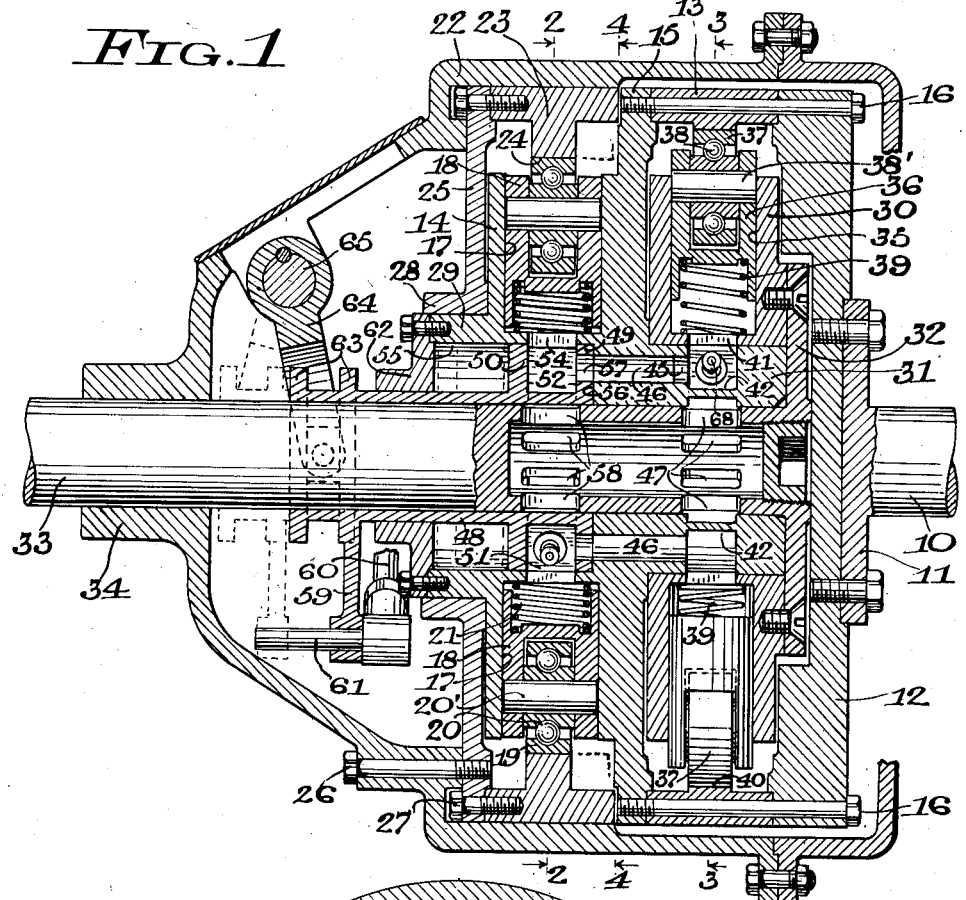

To effect a de-clutched condition, the valve member 48 is moved axially to the dotted line position of Fig. 1, whereupon the oil circulates idly in the oil passages without entering the quadrant spaces of the valve member, thus affording a freer neutral than is possible with the normal "N" position of Fig. 2. The pin 61 on the control rod is made sufficiently long to avoid losing its operative connection with the valve member lever when the valve member is moved to inoperative position.

It is noted that diametrically opposite pistons in the cylinder barrels are movable in phase during operation. This serves to balance reciprocating masses and permits high speed operation with a minimum of vibration. High speed operation is also facilitated by the use of anti-friction rollers on the pistons.

The use of springs to urge the pistons outwardly is not altogether necessary, as centrifugal force will serve the same purpose to a large extent, but the piston rollers are urged firmly against the trackway at all times when the springs are employed.

It is seen that the angular displacement of the valve member 48 changes its relation to the major and minor axes of the stationary cam ring 23 to control the passage of fluid from the cylinder barrel 14. It is obvious that the same change in relation would be effected by angularly displacing the cam ring with respect to the valve member, but the necessity for controlling the reaction on the cam ring would complicate the construction.

The transmission of this invention is particularly adapted for use in internal combustion engine-propelled automotive vehicles, where simplicity and ease of control are desirable characteristics.

What I claim as new and desire to secure by Letters Patent is:

1. In a hydraulic machine, the combination of a cylinder barrel having a plurality of cylinder bores therein, pistons movable in said bores, means for reciprocating said pistons for effecting a displacement of fluid in said cylinder bores, and an axially disposed angularly and axially displaceable valve member having ports in communication with said cylinder bores for controlling the passage of varying amounts of fluid from said cylinder barrel.

2. In a hydraulic machine, the combination of a cylinder barrel having a plurality of cylinder bores therein, fluid-displacing pistons movable in said bores, means for reciprocating said pistons, a centrally disposed valve member having ports in communication with said cylinder bores for controlling the passage of varying amounts of fluid from said cylinder barrel by the displacement of said valve member in pre-determined angular positions, and means for moving said valve member axially to inoperative position with respect to said cylinders for permitting the free by-pass of fluid between said cylinders.

3. In a hydraulic machine, the combination of a cylinder barrel having radially disposed cylinder bores provided with ports at their inner ends, pistons movable in said cylinder bores to displace fluid therein, means surrounding said cylinder barrel for reciprocating said pistons, a valve member disposed axially within said cylinder barrel and having ports in communication with said cylinder ports, said valve member being angularly movable to pre-determined positions for controlling the discharge of varying amounts of fluid from said cylinder barrel, and means for effecting an axial movement of said valve member to inoperative position with respect to said cylinder ports for permitting the free by-pass of fluid between said cylinder bores.

4. In a hydraulic transmission, the combination of a pair of co-axially disposed rotatable cylinder barrels having radially disposed cylinder bores provided with ports at their inner ends, pistons movable in said cylinder bores to displace fluid therein, a rotatable driving member connected to one of said cylinder barrels, stationary cam means surrounding said cylinder barrel and having an operative connection with the pistons in said barrel for reciprocating them during rotation of said cylinder barrel, a second cam means rotatable with said cylinder barrel and surrounding the other cylinder barrel in operative connection with the pistons therein, a driven member secured to said second cylinder barrel, and an angularly displaceable valve member disposed axially within said first-named cylinder barrel and having ports in communication with the cylinder ports of said cylinder barrel, said valve member being angularly movable to pre-determined positions for controlling the passage of varying amounts of fluid between said cylinder barrels to vary the speed of said driven member and adapted in one of its positions to prevent the displacement of fluid in said second cylinder barrel and to permit the by-passing of fluid between the cylinder bores of said first-named cylinder barrel.

5. In a hydraulic transmission, the combination of a rotatable cylinder barrel having radially disposed cylinder bores provided with ports at their inner ends, pistons movable in said cylinder bores to displace fluid therein, a stationary cam member surrounding said cylinder barrel and having an operative connection with the pistons in said cylinder barrel for reciprocating them during rotation of said cylinder barrel, a rotatable driving member connected to said cylinder barrel, a hub on said cylinder barrel having peripheral ports therein, a second cylinder barrel rotatably mounted on said hub and having radially disposed cylinder bores provided with ports at their inner ends communicating with the ports in said hub, a cam member rotatable with said first-named cylinder barrel and surrounding the second cylinder barrel in operative connection with the pistons therein, a driven member secured to sai' second cylinder barrel, and an angularly displaceable valve member disposed axially within said first-named cylinder barrel and having ports in communication with the ports of said cylinder barrel and other ports in communication with the ports in the hub of said cylinder barrel to establish communication between said cylinder barrels, said valve member being angularly movable to pre-determined positions for controlling the passage of varying amounts of fluid between said cylinder barrels to vary the speed of said driven member and adapted in one of its positions to prevent the displacement of fluid in said second cylinder barrel and to permit the by-passing of fluid between the cylinder bores of said first-named cylinder barrel.

6. In a hydraulic transmission, the combination of a rotatable cylinder barrel having radially disposed cylinder bores provided with ports at their inner ends, pistons movable in said cylinder bores to displace fluid therein, a cam member surrounding said cylinder barrel and having an elliptical trackway in operative connection with the pistons in said cylinder barrel for reciprocating them in compressing and expanding quarters during rotation of said cylinder barrel, a rotatable driving member connected to said cylinder barrel, a hub on said cylinder barrel having peripheral ports therein, a second cylinder barrel rotatably mounted on said hub and having radially disposed cylinder bores provided with ports at their inner ends communicating with the ports in said hub, a cam member rotatable with said first-named cylinder barrel and having an elliptical trackway surrounding the second cylinder barrel in operative connection with the pistons therein to afford compressing and expanding quarters, a driven member secured to said second cylinder barrel, and a valve member disposed axially within said first-named cylinder barrel and having ports in communication with the ports of said cylinder barrel and other ports in communication with the ports in the hub of said cylinder barrel to establish communication between said cylinder barrels, the relation of said valve member to the major and minor axes of said first-named cam member being changeable for controlling the passage of varying amounts of fluid between said cylinder barrels to vary the speed of said driven member.

7. In a hydraulic transmission, the combination of a pair of co-axially disposed rotatable cylinder barrels having radially-disposed cylinder bores provided with ports at their inner ends, fluid-displacing pistons movable in said cylinder bores, a rotatable driving member connected to one of said cylinder barrels, stationary cam means having an operative connection with the pistons in said barrel for reciprocating them during rotation of said cylinder barrel, a second cam means rotatable with said cylinder barrel and having an operative connection with the pistons in the other cylinder barrel, a driven member secured to said second cylinder barrel and extending through said first-named cylinder barrel, and an axially-disposed angularly-displaceable valve member having ports in communication with the ports of the first-named cylinder barrel and being angularly movable to pre-determined positions for controlling the passage of varying amounts of fluid between said cylinder barrels to vary the speed of said driven member with respect to said driving member.

8. In a hydraulic transmission, the combination of a pair of co-axially disposed rotatable cylinder barrels having radially-disposed cylinder bores provided with ports at their inner ends, fluid-displacing pistons movable in said cylinder bores, a rotatable driving member connected adjacent the periphery of one of said cylinder barrels, stationary cam means surrounding said cylinder barrel and having an operative connection with the pistons in said barrel for reciprocating them during rotation of said cylinder barrel, a second cam means rotatable with said cylinder barrel and surrounding the other cylinder barrel in operative connection with the pistons therein, a driven member secured to said second cylinder barrel and extending through said first-named cylinder barrel, and an angularly displaceable valve member disposed axially within said first-named cylinder barrel and having ports in communication with the ports in said cylinder barrel, said valve member being angularly movable to pre-determined positions for controlling the passage of varying amounts of fluid between said cylinder barrels to vary the speed of said driven member with respect to said driving member.

9. In a hydraulic transmission, the combination of a pair of co-axially disposed rotatable cylinder barrels disposed side by side and having radially-extending cylinder bores provided with ports at their inner ends, one of said cylinder barrels having a peripheral flanged portion at the side adjacent the other cylinder barrel, a rotatable driving member connected to the flanged portion of said first-named cylinder barrel and disposed about said second-named cylinder barrel, stationary cam means surrounding said first-named cylinder barrel and having an operative connection with the fluid-displacing pistons therein, a second cam means rotatable with said first-named cylinder barrel and surrounding the other cylinder barrel in operative connection with the pistons therein, a driven member secured to said second cylinder barrel and extending through said first-named cylinder barrel, and an angularly displaceable valve member disposed axially within said first-named cylinder barrel in communication with the cylinder ports of said barrels for controlling the passage of fluid between said cylinder barrels.

10. In a hydraulic transmission, the combination of a pair of relatively rotatable cylinder barrels each having a plurality of radially disposed cylinder bores provided with ports at their inner ends, fluid-displacing pistons movable in said bores, one of said cylinder barrels having a ported hub on which the inner ported portion of the other cylinder barrel is rotatably mounted to form a valve between said cylinder barrels, a cam ring fixedly secured to said hubbed cylinder barrel in predetermined relation to the valve-forming ports in said hub and surrounding the other cylinder barrel in operative connection with the pistons therein, a second cam ring surrounding said hubbed cylinder barrel in operative connection with the pistons therein, and a valve member disposed axially of said hubbed cylinder barrel in communication with the ports therein to control the passage of fluid between said cylinder barrels, said valve member and said last-named cam ring being stationary but relatively angularly adjustable to vary the amount of fluid passing between said cylinder barrels.

11. In a hydraulic transmission, the combination of a pair of relatively rotatable cylinder barrels having radially disposed cylinder bores provided with ports at their inner ends, fluid-displacing pistons movable in said bores, one of said cylinder barrels being relatively rotatably mounted in contact with the other and the contacting portions of said cylinder barrels having valve-forming ports communicating with said cylinder bores, a cam ring rotatable with one of said cylinder barrels and surrounding the other cylinder barrel in operative connection with the pistons therein, a second cam ring surrounding the cylinder barrel with which said first-named cam ring is rotatable and having an operative connection with the pistons therein, and a valve member disposed axially with respect to said cylinder barrels in communication with the ports therein for controlling the passage of fluid between said cylinder barrels, said valve member and second cam ring having a predetermined but relatively angularly adjustable relation for varying the amount of fluid passing between said cylinder barrels.

12. In a hydraulic transmission, the combination of a pair of relatively rotatable cylinder barrels one rotatably mounted on the other and each having a plurality of radially disposed cylinder bores therein, fluid-displacing pistons movable in said bores, means for driving one of said cylinder barrels, stationary cam means surrounding said driving cylinder barrel and having an operative connection with the pistons therein, a second cam means surrounding the other of said cylinder barrels and secured to rotate with said driving cylinder barrel, a driven member secured to said other cylinder barrel, and angularly displaceable valve means for controlling the passage of said fluid between said barrels.

13. In a hydraulic transmission, the combination of a cylinder barrel having fluid-displacing pistons movable therein, a cam member in operative connection with said pistons for effecting the displacement of fluid during relative rotation of said cylinder barrel and cam member, a ported valve member in communication with said cylinders, said valve member and cam member having a relative angular adjustment to control the passage of varying amounts of fluid from the cylinder barrel, and means for axially displacing said valve member for permitting the idle flow of fluid within the cylinder barrel.

In testimony whereof, I affix my signature.

ROYAL LEE.